United States Patent [19]
Smith et al.

[11] Patent Number: 5,898,039
[45] Date of Patent: Apr. 27, 1999

[54] FOAMING METHOD

[75] Inventors: Peter John Smith, Northwich; Bernard John Cross, Cleveland, both of United Kingdom

[73] Assignee: Imperial Chemical Industries PLC, London, United Kingdom

[21] Appl. No.: 08/765,849

[22] PCT Filed: Jun. 7, 1995

[86] PCT No.: PCT/GB95/01315

§ 371 Date: May 8, 1997

§ 102(e) Date: May 8, 1997

[87] PCT Pub. No.: WO96/00257

PCT Pub. Date: Jan. 4, 1996

[30] Foreign Application Priority Data

Jun. 24, 1994 [GB] United Kingdom .................. 9412725
Jun. 24, 1994 [GB] United Kingdom .................. 9412726

[51] Int. Cl.⁶ ...................................................... C08J 9/14
[52] U.S. Cl. .............................................. 521/81; 521/139
[58] Field of Search ...................................... 521/81, 139

[56] References Cited

U.S. PATENT DOCUMENTS 4,196,267  4/1980  Watanabe et al. .

FOREIGN PATENT DOCUMENTS 1 210 672  10/1970  United Kingdom .

OTHER PUBLICATIONS

Database WPI, Week 9208, Derwent Publications Ltd., London, GB; AN 92:061823 'Foamed polystyrene with uniform, fine cell structure. '& JP ,A, 4 008 738 (Chisso Corp.) Jan. 13, 1992 see abstract.

*Primary Examiner*—Morton Foelak

[57] ABSTRACT

A process for forming a foamed article having a closed cell structure without the need to use a halogenated blowing agent. In the process, a polymer blend comprising at least 50% by weight of a styrenic polymer and up to 50% by weight of an acrylic polymer which has an average molecular weight which is less than 90% of that of the styrenic polymer and a hydrocarbon blowing agent are supplied to a heated extruder where the blend is formed and the blowing agent incorporated to form a molten mixture from which the foamed article is formed on release from the extruder.

8 Claims, No Drawings

FOAMING METHOD

The present invention relates to a method of preparing foamed articles formed from a blend of a styrenic polymer and at least one acrylic polymer.

It is well known that polystyrene may be readily foamed by a variety of processes, including extrusion. The density of such industrially produced polystyrene foam, absent any particular treatment is usually of the order of 32 kg.m$^{-3}$.

GB 2146941 discloses the preparation of a polystyrene foam by an extrusion process.

EP 0411923 is directed towards the preparation of polystyrene foam having a density from 32 to 160 kg.m$^{-3}$ using an extrusion process in which liquid carbon dioxide is employed as a blowing agent instead of a conventional halogenated hydrocarbon blowing agent. As is well known, the use of such halogenated hydrocarbons presents certain risks to the environment and is therefore increasingly unacceptable. However, a process which uses carbon dioxide as a blowing agent has the attendant complication of requiring the refrigeration of the liquid carbon dioxide.

The preparation of normal to low density polystyrene foam, i.e. foam having a density of 32 kg.m$^{-3}$ or less, using a physical blowing agent which is neither non-halogenated hydrocarbons nor liquid carbon dioxide is difficult to achieve.

U.S. Pat. No. 3,554,932 is directed towards the use of nucleating agents to improve the foaming of variety of polymers, including styrene homopolymer, using a hydrocarbon blowing agent. The density of the styrene foam is about 64 kg.m$^{-3}$. In order to prepare a normal density foam from such a material it is typically necessary to either foam the material directly into a sub atmospheric pressure environment or else to subject the material to some form of controlled re-expansion, for example U.S. Pat. No. 4,552,904 discloses the preparation of a polystyrene foam having a density of less than 32 kg.m$^{-3}$ by the re-expansion of an extruded foam. Such requirements add to the complexity of the foam making process and the expense of the hydrocarbon blown foam.

It is an object of the present invention to provide a normal or low density polystyrene foam using a conventional extrusion foaming process using a hydrocarbon blowing agent, without the need to use re-expansion or an other such technique.

Accordingly, in a first aspect the present invention provides a process for forming a foamed article having a closed cell structure comprising (a) a polymer blend comprising at least 50% by weight of a styrenic polymer and up to 50% by weight of an acrylic polymer which has an average molecular weight which is less than 90% of that of the styrenic polymer and (b) a hydrocarbon blowing agent, which process comprises supplying the styrenic polymer and acrylic polymer to a heated extruder, heating and mixing the styrenic polymer and acrylic polymer in the extruder so as to form a molten polymer blend, incorporating a hydrocarbon blowing agent into the molten polymer blend within the extruder to form a molten mixture and thereafter releasing the from the extruder so as to cause the blowing agent to expand the molten mixture to form the foamed article.

In a second aspect the present invention provides a foamed article having a closed cell structure comprising (a) a polymer blend comprising at least 50% by weight of a styrenic polymer and up to 50% by weight of an acrylic polymer which has an average molecular weight which is less than 90% of that of the styrenic polymer and (b) a hydrocarbon blowing agent.

The styrenic polymer may be a homopolymer or a copolymer of at least one of styrene, methyl styrene, acrylonitrile. Preferably at least 50% of the monomer units of the styrenic polymer are derived from styrene and in particular the styrenic polymer is a homopolymer of styrene.

Suitably, the styrenic polymer has an average molecular weight from 180000 to 250000, and preferably from 180000 to 230000, for example about 200000.

The acrylic polymer is a homopolymer or a copolymer of at least one $C_{1-8}$ alkyl($C_{0-4}$ alkyl)acrylate, for example methyl methacrylate, methyl acrylate, ethyl acrylate, propyl acrylate and butyl acrylate. Preferably the acrylic polymer is a copolymer, particularly a copolymer containing a methacrylate, e.g. methyl methacrylate, and an acrylate, such as methyl acrylate or ethyl acrylate. The acrylic polymer preferably contains from 50 to 100%, particularly from 80 to 95, and especially 90 to 95 by weight of monomer units which are derived from a methacrylate, e.g. methyl methacrylate, with the balance of the monomer units being derived from at least one acrylate.

The acrylic polymer has an average molecular weight which is less than 90%, preferably less than 80%, particularly less than 75% and especially from 50 to 60%, that of the styrenic polymer. Suitably, the acrylic polymer has an average molecular weight from 50000 to 180000, preferably from 50000 to 150000 and particularly from 80000 to 140000.

The foamed article has a closed cell structure. Typically, the closed cells have sides in the range from 100 to 1000 μm, particularly from 100 to 900 μm and especially from 100 to 600 μm.

The density of the foamed article is comparable or less than that of a similarly foamed article formed from the styrenic polymer alone using a conventional halogenated hydrocarbon as a blowing agent. It is believed that the hydrocarbon blowing agent is more compatible with the acrylic polymer in the blend than with the styrenic polymer and that by using the acrylic polymer more hydrocarbon blowing agent can be incorporated than usual thereby leading to a lower density foam.

The properties of the foamed article, such as thermal conductivity, remain comparable, although consistently lower, to those of a similarly foamed article formed from the styrenic polymer alone. Typical thermal conductivities of foamed articles immediately after manufacture thus range from 20 to 24 mW.(mK)$^{-1}$, for example about 21 mW.(mK)$^{-1}$ and rise, after equilibrating with the environment, to range from 25 to 27 mW.(mK)$^{-1}$, for example about 26 mW.(mK)$^{-1}$. Similarly foamed styrenic polymer would have a thermal conductivity as manufactured of about 24 mW.(mK)$^{-1}$ which rises to about 27 mW.(mK)$^{-1}$ with time.

The compression strength of the foamed article does reduce with increasing acrylic polymer content. However, at an acrylic polymer content of 50% or less, the compression strength may be maintained from 150 to 260 kPa.

In use the foamed article may be laminated onto any suitable support material, e.g. plasterboard, wood or an other plastics structure, in order to form an insulated building material and the like.

The foamed article may be formed on conventional extrusion equipment. When so formed, the variation in density across a cross-section of the foamed article which is normal to the axis of extrusion shows a typical "bath-tub" curve, i.e. the foamed article is less dense at the centre than at the surface. Although the bath-tub curve is typical of extrusion foamed material, the observed densities have hitherto only been attainable by foam extrusion of conventional styrenic polymers into a vacuum or by re-expansion, e.g. by heating in air or steam, in which latter case the bath-tub curve becomes inverted.

Suitable hydrocarbon blowing agents are those typical of the art. Preferably the blowing agent is selected from propane, butane, pentane, isopentane, cyclopentane and heptane. The quantity of the blowing agent used will depend, at least in part, on the composition of the polymer blend and the desired density of the foamed article. Typically, less hydrocarbon blowing agent than halogenated hydrocarbon blowing agent can be accommodated in a particular polymer blend. Usually therefore the hydrocarbon blowing agent is usually employed at a level from 2 to 10, preferably from 4 to 8 kg per 100 kg of polymer.

The following examples further illustrate the present invention.

EXAMPLE 1

In this example, the acrylic polymer that was used was a copolymer of methyl methacrylate with 5% ethyl acrylate (EA) having an average molecular weight of 129000. The polymer blend was then formed using 22% w/w of this acrylic polymer in conjunction with 78% w/w of a homopolymer of styrene having an average molecular weight of about 200000. The polymer blend was heated in a conventional extruder to which the blowing agent was then added and thereafter extruded to atmosphere through a die slot having dimensions 3 mm by 300 mm.

The difference in density is with respect to a foamed article prepared from the homopolymer of styrene on the same equipment using R22 as blowing agent.

| Example | % Blowing Agent | Density Difference (%) | Blowing Agent |
|---------|-----------------|------------------------|---------------|
| 1a      | 13              | −17                    | R22           |
| 1b      | 5.7             | −1                     | Butane        |

It is therefore evident that a hydrocarbon blowing agent can be used to produce a normal density foam provided that the styrenic polymer is modified by the inclusion of an acrylic polymer.

We claim:

1. A process for forming a foamed article having a closed cell structure and comprising (a) a polymer blend comprising at least 50% by weight of a styrenic polymer and up to 50% by weight of an acrylic polymer which is a homopolymer or a copolymer consisting of at least one $C_{1-8}$ alkyl ($C_{0-4}$ alkyl)acrylate and has an average molecular weight which is less than 90% of that of the styrenic polymer and (b) a hydrocarbon blowing agent, which process comprises supplying the styrenic polymer and acrylic polymer to a heated extruder, heating and mixing the styrenic polymer and acrylic polymer in the extruder so as to form a molten polymer blend, incorporating a hydrocarbon blowing agent into the molten polymer blend within the extruder to form a molten mixture and thereafter releasing the molten mixture from the extruder so as to cause the blowing agent to expand the molten mixture to form the foamed article.

2. A process as claimed in claim 1 wherein at least 50% of the monomer units of the styrenic polymer are derived from styrene.

3. A process as claimed in claim 2 wherein the styrenic polymer is a homopolymer of styrene.

4. A process as claimed in claim 1 wherein the styrenic polymer has an average molecular weight from 180000 to 250000.

5. A process as claimed in claim 1 wherein the acrylic polymer contains from 50 to 100% by weight of monomer units which are derived from a methacrylate with the balance of the monomer units being derived from at least one acrylate.

6. A process as claimed in claim 1 wherein the closed cells have sides in the range from 100 to 1000 $\mu$m.

7. A process as claimed in claim 1 wherein the blowing agent is selected from propane, butane, pentane, isopentane, cyclopentane and heptane.

8. A process as claimed in claim 1 wherein the hydrocarbon blowing agent is employed at a level from 2 to 10 kg per 100 kg of polymer blend.

* * * * *